United States Patent [19]

Paul

[11] Patent Number: 4,606,895
[45] Date of Patent: Aug. 19, 1986

[54] ION EXCHANGE LOADING
[75] Inventor: James M. Paul, DeSoto, Tex.
[73] Assignee: Mobil Oil Corporation, New York, N.Y.
[21] Appl. No.: 549,932
[22] Filed: Nov. 9, 1983
[51] Int. Cl.$^4$ ............................................. C01G 43/00
[52] U.S. Cl. ....................................................... 423/7
[58] Field of Search ............................................ 423/7
[56] References Cited

U.S. PATENT DOCUMENTS

| | | | |
|---|---|---|---|
| 4,155,982 | 5/1979 | Hunkin et al. | 423/7 |
| 4,235,850 | 11/1980 | Otto | 423/7 |
| 4,296,075 | 10/1981 | Yan | 423/7 |
| 4,298,578 | 11/1981 | Yan et al. | 423/7 |
| 4,339,414 | 7/1982 | Moore | 423/7 |
| 4,410,497 | 10/1983 | Otto | 423/11 |
| 4,460,547 | 7/1984 | Sameh et al. | 423/7 |

Primary Examiner—Edward A. Miller
Attorney, Agent, or Firm—Alexander J. McKillop; Michael G. Gilman; Charles A. Malone

[57] ABSTRACT

The present invention relates to a method for increasing the amount of uranium values loaded on an ion-exchange resin by adding an oxidant, such as hydrogen peroxide, to a uranium containing lixiviant prior to contacting the lixiviant with an ion exchange resin to adsorb the uranium values therein.

17 Claims, No Drawings

ION EXCHANGE LOADING

FIELD OF THE INVENTION

The present invention relates to the production of uranium and more particularily to the recovery of uranium values from lixiviants by ion exchange adsorption. More specifically, the present invention relates to a method for increasing the loading of uranium values on ion exchange resin.

BACKGROUND OF THE INVENTION

Uranium is produced from uranium-bearing ores by various procedures which employ a carbonate or acid lixiviant to leach the uranium from its accompanying gangue material. The acid lixiviants usually are formulated with sulfuric acid which solubilizes uranium as complex uranyl sulfate anions. The sulfuric acid normally is used in a concentration to maintain a pH between about 0.5 to 2.0. However mild acidic solutions such as carbonic acid solutions, having a pH between about 5.0 and 7.0 may also be employed. Carbonate lixiviants contain carbonate lixiviants may be formulated by the addition of alkali metal carbonates and/or bicarbonates or by the addition of carbon dioxide either alone or with an alkaline agent such as ammonia or sodium hydroxide in order to control the pH. The pH of the carbonate lixiviants may range from about 5 to 11. The carbonate lixiviants may also contain a sulfate leaching agent. The lixiviant also contains a suitable oxidizing agent such as oxygen or hydrogen peroxide.

The leaching operation may be carried out in conjunction with surface milling operations wherein uranium ore obtained by mining is crushed and blended prior to leaching, heap leaching of ore piles at the surface of the earth, or in situ leaching wherein the lixiviant is introduced into a subterranean ore deposit and then withdrawn to the surface. Regardless of the leaching operation employed, the pregnant lixiviant is then treated in order to recover the uranium therefrom. One conventional uranium recovery process involves passing the pregnant lixiviant through an anionic exchange resin and the elution of the resin with a suitable eluant to desorb the uranium from the resin. The resulting concentrated eluate is then treated to recover the uranium values, for example, by precipitating uranium therefrom to produce the familiar "yellowcake".

The anionic ion exchange resins employed for uranium concentration are characterized by fixed cationic adsorption sites in which the mobile anion, typically chloride or another halide, hydroxide, carbonate or bicarbonate, is exchanged by the uranyl complex anion. Such anionic ion exchange resins are disclosed, for example, in Merritt, R. C., THE EXTRACTIVE METALLURGY OF URANIUM, Colorado School of Mines Research Institute, 1971, pages 138–147, which are hereby incorporated by reference. Suitable anionic exchange resins may take the form of polymers or copolymers of styrene substituted with quaternary ammonium groups or polymers or copolymers of pyridine which are quaternized to form pyridinium groups.

Several methods have been described to increase the efficiency of the ion-exchange resin either by extending the resin life by regeneration or by utilizing means to protect the resin from degradation. For example, U.S. Pat. No. 4,397,819 to Yan et al. relates to a process for restoring and maintaining the total ion-exchange capacity of the resin used for uranium recovery by treating the resin with a solution containing $Na_2CO_3$ or $NaHCO_3$, or admixtures thereof.

U.S. Pat. No. 4,298,578 to Yan et al. relates to a method for recovering uranium and/or related values which include means for protecting ion-exchange resins in the recovery operation from oxidative degradation due to contact with hydrogen peroxide. A guard chamber is positioned in the elution circuit so that barren eluant, after it is stripped of its uranium and/or related values by treatment with hydrogen peroxide, will flow through the chamber. The guard chamber contains catalytic material, e.g. activated carbon, which decomposes hydrogen peroxide upon contact into water and oxygen. The barren eluant, after it passes through the catalytic material, is used to make up fresh eluant for reuse in the recovery method without the risk of the fresh eluant causing oxidative degradation of the resins.

U.S. Pat. No. 4,235,850 to Otto, Jr. relates to a process for the recovery of uranium from a saline alkaline lixiviant employed in a uranium leaching operation. An ion exchange resin is employed to absorb uranium from the lixiviant. Prior to contacting the resin with the lixiviant, the pH of the lixiviant is reduced to a value of less than 7. By this technique, the resin loading in the presence of chloride ion is materially increased. The pH values for optimum resin laoding capacity decrease as the salinity of the lixiviant increases. Resin loading is enhanced by the presence of bicarbonate ion in the lixiviant.

As can be seen from the above, it is desirable to increase the efficiency of an ion-exchange resin system by either extending the life of the resin or by increasing the loading capacity of the resin.

SUMMARY OF THE INVENTION

Accordingly, it is an object of the present invention to improve a uranium recovery process by sustantially increasing the loading capacity of the ion-exchange resin utilized in the uranium recovery cycle.

Thus, the present invention provides a method for the recovery of uranium values from a uranium-containing carbonate lixiviant by adding to the lixiviant a sufficient amount of oxidant to convert a substantial amount of the uranium values in the lixiviant to uranyl dicarbonate prior to passing the lixiviant through an ion-exchange resin. It is preferred that from 2 ppm to about 80 ppm by weight of hydrogen peroxide be added as the oxidant.

DESCRIPTION OF THE SPECIFIC EMBODIMENTS

As noted previously, the recovery of uranium from pregnant lixiviant involves concentration of the uranium employing an ion exchange resin and subsequent precipitation to recover the uranium as yellowcake. The pregnant lixiviant is passed through one or more ion exchange columns operated in accordance with any suitable procedure. Such procedures are well known in the art and are described in Merritt, R. C., THE EXTRACTIVE METALLURGY OF URANIUM, Colorado School of Mines Research Institute (1971) at page 167 et. Seq. under the heading "Ion Exchange Processes and Equipment". For example, the ion exchange column may be operated in a "fixed bed" mode or "moving bed" mode as described in Merritt. However, in accordance with the present invention, the ion exchange process is modified to allow the addition of chemicals to the pregnant lixiviant prior to passing such through the ion-exchange resin.

The anionic ion exchange resins most commonly employed in uranium recovery operations are the so-called "Type I" resins in which the adsorption sites are provided by quaternary ammonium groups in which all of the quaternizing substituents are alkyl groups, normally methyl groups. The Type I resins may be prepared by chloromethylation of the base polyaryl polymer and subsequent reaction with a tertiary amine such as trimethylamine. The so-called "Type II" resins may also be used in uranium recovery and are particularly useful in the concentration of uranium from lixiviants containing chloride ions which inhibit the adsorption of uranyl ions. The Type II resins are characterized by cationic adsorption sites provided by quaternary ammonium groups having a hydroxy alkyl group as a quarternizing substituent. Typically the cationic adsorption sites for Type II resins take the form of methylene hydroxyalkyldimethylammonium groups in which the hydroxyalkyl group contains one or two carbon atoms. The Type II resins may be prepared by reaction of the chloromethylated base polymer with a tertiary amine such as dimethylethanolamine or dimethylmethanolamine. For a further description of Type I and Type II resins, reference is made to Dowex: Ion Exchange, the Dow Chemical Co., Midland, Mich. (1958, 1959), and specifically the section entitled "Strong Base Resins" found in pages 4 and 5. As indicated there, a commercially available Type II resin is Dowex 2 in which the cationic adsorption sites are provided by methylene hydroxyethyldimethylammonium groups. Other commercially available Type II ion exchange resins include Duolite 102D available from the Diamond Shamrock Chemical Company, Ionac A-550 and Ionac A-651 available Ionac Chemical Company, and IRA 410 and IRA 910 available from the Rohm & Haas Company. In each of these resins, the resin network is formed of copolymers of styrene and divinylbenzene having various degrees of crosslinking and the cationic functional groups are provided by methylene hydroxyethyldimethylammonium groups, similarly as in the case of Dowex 2.

When reference is made to a carbonate lixiviant, it is intended that such includes any leaching system which complexes the uranium in the form of a carbonate. For example, suitable carbonate leaching systems for use with the present invention can be defined as those carbonate leaching solutions having a pH of from about 6 to about 11.0. In addition to the conventional alkali metal carbonate and/or bicarbonate systems, carbon dioxide/oxygen systems are also included as suitable carbonate leaching fluids in the application of the present invention.

In accordance with one aspect of the present invention, a uranium-bearing ore, whether in situ or above ground, is contacted with a suitable carbonate leaching solution and an oxidant to solubilize the uranium values therein. When a carbonate leaching system is utilized, the uranium values are solubilized as a tetravalent carbonate anion. For example when a $CO_2/O_2$ leaching system is utilized, the uranium is solubilized predominately as the tetravalent uranyl tricarbonate anion, $UO_2(CO_3)_3^{4-}$. After the pregnant leachate is separated from the ore, a sufficient amount of oxidant, preferrably hydrogen peroxide, is added to convert the tetravalent uranyl carbonate to a divalent uranyl carbonate anion such as uranyl dicarbonate, $UO_2(CO_3)_2^{2-}$. It has been determined that the addition of from about 2 ppm (by weight) to about 80 ppm of hydrogen peroxide substantially increases the loading capacity of the ion-exchange resin. The amount of oxidant, such as hydrogen peroxide, will vary with the leachate utilized and the type of resin.

To better illustrate the invention, a synthetic leachate was prepared. The solution contained 1500 ppm $CO_3^=$, 102 ppm $U_3O_8$ and had a pH of 8. Under such conditions, uranium is normally found as $UO_2(CO_3)_3^{4-}$. The loading capacity of a 16/20 mesh resin was tested. Five batch loadings were run at the same time using one liter Erlenmyer flasks stirred with magnetic stirrers. One liter of the above-prepared solution was added to each flask. No adjustment of initial conditions was made to Tests 0 and 1. To tests 2, 3, and 4 were added 5, 15, and 30 ppm $H_2O_2$ respectively. 1 cm$^3$ of the resin was quantitatively transferred to each of flasks 1, 2, 3 and 4. The solutions were then stirred for about 100 hours. Stirring was stopped only enough to allow resin to settle before taking a sample of solution for uranium analysis. $H_2O_2$ was added to Tests 2, 3, and 4 after 48 hours to maintain the concentration of $H_2O_2$ in the solution. Experimental conditions are shown in Table I.

TABLE I

COMPARATIVE BATCH URANIUM LOADING CAPACITY OF PREGNANT LEACHATE USING DIFFERENT $H_2O_2$ CONCENTRATIONS
Initial pH = 8.0, Total $CO_3^=$ = 1500 ppm, 102 ppm $U_3O_8$

| Test No. | Loading Test No. | pH | $CO_3^=$ ppm | $H_2O_2$ ppm | Resin cm$^3$ | Composite Volumes L | Concentration ppm $U_3O_8$ Initial | Concentration ppm $U_3O_8$ Final | Total Loading Lb $U_3O_8$/ft$^3$ |
|---|---|---|---|---|---|---|---|---|---|
| 0 | 0 | 8 | 1500 | — | — | 1 | 97 | 97 | — |
| 1 | 1 | 8 | 1500 | — | 1 | 1 | 102 | 55.6 | 3 |
| 2 | 2 | 8 | 1500 | 5 | 1 | 1 | 102 | 15.4 | 5.6 |
| 3 | 3 | 8 | 1500 | 15 | 1 | 1 | 102.7 | 2.8 | 6.2 |
| 4 | 4 | 8 | 1500 | 30 | 1 | 1 | 102 | 2.0 | 6.2 |

Elution tests of the resin were performed to find out how much uranium loaded on the resin. Elutions were run by stirring the resin in 50 ml of 0.3 HCl for 90 minutes and then analyzing the eluate for uranium. This procedure was repeated until the uranium concentration approached zero. Data for the batch elutions are given in Table II.

TABLE II

COMPARATIVE URANIUM LOADINGS CALCULATED FROM 0.3 HCl ELUTION BATCH TEST RESULTS (TEST 1, 2, 3 AND 4)

| Loading Run No. | Volume Eluted ml | Time Hrs. | $U_3O_8$ Concentration ppm $U_3O_8$ | $U_3O_8$ Eluted | Total mg $U_3O_8$ Eluted | lb $U_3O_8$/ft$^3$ Eluted |
|---|---|---|---|---|---|---|
| 1 | 48 | 1.3 | 826 | 39.70 | 39.85 | 2.5 |
| 1 | 50 | 1.3 | 3 | 0.15 | | |
| 1 | 50 | 1.3 | 0 | 0 | | |
| 2 | 51 | 1.3 | 1407 | 71.76 | 78.22 | 5 |

TABLE II-continued
COMPARATIVE URANIUM LOADINGS CALCULATED FROM 0.3 HCl ELUTION BATCH TEST RESULTS (TEST 1, 2, 3 AND 4)

| Loading Run No. | Volume Eluted ml | Time Hrs. | $U_3O_8$ Concentration ppm $U_3O_8$ | $U_3O_8$ Eluted | Total mg $U_3O_8$ Eluted | lb $U_3O_8$/ft³ Eluted |
|---|---|---|---|---|---|---|
| 2 | 54 | 1.3 | 109 | 5.89 | | |
| 2 | 51 | 1.3 | 11.2 | 0.57 | | |
| 3 | 50 | 1.3 | 1103 | 55.15 | 88.0 | 5.5 |
| 3 | 50 | 1.3 | 417 | 20.85 | | |
| 3 | 49 | 1.3 | 244.4 | 11.98 | | |
| 4 | 50 | 1.3 | 1132 | 56.6 | 90.6 | 5.7 |
| 4 | 50 | 1.3 | 399 | 19.95 | | |
| 4 | 51 | 1.3 | 275.2 | 14.04 | | |

As can be seen from the above, Test 1, without added $H_2O_2$, gave the poorest ion exchange performance. Adding 5 ppm $H_2O_2$ greatly improved performance; about a 100% increase in loading capacity was seen. Adding 15 ppm and 30 ppm $H_2O_2$ improved performance only slightly more than addition of 5 ppm $H_2O_2$.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for the recovery of uranium values from a pregnant uranium-containing carbonate lixiviant comprising the steps of:
   (a) adding to said uranium-containing lixiviant from about 2 ppm to about 80 ppm by weight hydrogen peroxide which converts said uranium values from the $UO_2(CO_3)_3^{-4}$ species to $UO_2(CO_3)_2^{31\ 2}$; and
   (b) passing said lixiviant from step (a) containing said converted species through an ion-exchange resin which conversion causes said resin to retain substantially increased amounts of uranium values therein.

2. The process of claim 1 further comprising the step of recovering said uranium values from said ion exchange resin.

3. The process of claim 1 wherein the carbonate lixiviant comprises carbonates, bicarbonates or any mixture thereof.

4. The process of claim 1 wherein said carbonate lixiviant is obtained by passing carbon dioxide through water.

5. A method for the recovery of uranium values from uranium-containing ore comprising the steps of:
   (a) contacting the ore with a carbonate lixiviant sufficient to cause the carbonate lixiviant to solubilize the uranium values in the ore;
   (b) separating the lixiviant, containing uranium values, from the ore;
   (c) adding from 2 ppm to 80 ppm by weight hydrogen peroxide to said lixiviant which amount is sufficient to convert said uranium values from the $UO_2(CO_3)_3^{-4}$ species to $UO_2(CO_3)_2^{31\ 2}$; and
   (d) contacting said lixiviant from step (c) containing said converted species with an ion-exchange resin which conversion causes said resin to retain substantially increased amounts of uranium-values therein.

6. The process of claim 5 further comprising the step of recovering said uranium values from said ion exchange resin.

7. The process of claim 5 wherein the carbonate lixiviant comprises carbonates, bicarbonates, or any mixture thereof.

8. The process of claim 5 wherein said carbonate lixiviant is obtained by passing carbon dioxide through water.

9. The process of claim 5 wherein said oxidant is selected from the group consisting of hydrogen peroxide, oxygen, oxygen-containing gas, air, or any mixture thereof.

10. A method for the recovery of mineral values from uranium mineral-containing ore comprising the steps of:
    (a) contacting the ore with a lixiviant which contains a mineral complexing agent sufficient to cause said lixiviant to solubilize the mineral values by complexing the mineral values with the mineral complexing agent to form a multivalent anion;
    (b) separating the lixiviant, pregnant with mineral values in the form of multivalent anionic species, from said ore;
    (c) adding hydrogen peroxide to the pregnant lixiviant wherein said hydrogen peroxide is present in sufficient amounts to cause a conversion in the valency of the multivalent mineral value anionic species from step (a); and
    (d) contacting said pregnant lixiviant from step (c) containing said converted species with an ion-exchange resin which conversion causes said resin to retain substantially increased loads of said converted mineral values.

11. The process of claim 10 wherein the mineral values consist essentially of uranium values.

12. The process of claim 11 wherein the uranium-complexing agent comprises carbonates, bicarbonates or any mixtures thereof.

13. The process of claim 11 wherein the uranium-complexing agent in the lixiviant is obtained by passing carbon dioxide through water.

14. The process of claim 12 wherein the multivalent anion comprises $UO_2(CO_3)_3^{4-}$.

15. The process of claim 12 wherein step (c) is carried out by adding from about 2 ppm to about 80 ppm by weight of hydrogen peroxide.

16. The process of claim 14 wherein a sufficient amount of $H_2O_2$ is added in step (c) to convert the $UO_2(CO_3)_3^{4-}$ uranium in said ore to $UO_2(CO_3)_2^{2-}$.

17. The process of claim 10 wherein step (c) results in at least a 50% increase in the loading capacity of said resin as compared to a process without step (c).

* * * * *